(12) United States Patent
Brady et al.

(10) Patent No.: US 7,436,090 B1
(45) Date of Patent: Oct. 14, 2008

(54) DIRECT DRIVE HYBRID ROTARY MOTOR

(75) Inventors: David J. Brady, Marlton, NJ (US);
Joseph P. Teter, Mount Airy, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 294 days.

(21) Appl. No.: 11/250,704

(22) Filed: Oct. 5, 2005

Related U.S. Application Data

(63) Continuation-in-part of application No. 10/807,580, filed on Mar. 23, 2004, now abandoned.

(51) Int. Cl.
*H02K 7/06* (2006.01)
*H02K 37/00* (2006.01)

(52) U.S. Cl. .................. 310/20; 310/24; 310/49 R; 74/25

(58) Field of Classification Search ............ 310/24, 310/20, 23, 37, 48, 49 R; 91/472; 74/25
See application file for complete search history.

(56) References Cited

U.S. PATENT DOCUMENTS

| | | | | |
|---|---|---|---|---|
| 3,424,059 A | * | 1/1969 | Connor et al. ............... 91/176 |
| 3,696,680 A | * | 10/1972 | Deming et al. ............... 74/1.5 |
| 3,848,515 A | * | 11/1974 | Gardineer et al. ............ 91/184 |
| 4,066,002 A | * | 1/1978 | Eastman ....................... 91/36 |
| 4,498,032 A | | 2/1985 | Pinson |
| 5,602,434 A | | 2/1997 | Riedl |
| 6,186,290 B1 | | 2/2001 | Carlson |
| 6,367,342 B1 | * | 4/2002 | Weismann et al. ............ 74/335 |
| 6,781,264 B1 | | 8/2004 | Conrad et al. |
| 6,794,772 B1 | * | 9/2004 | Bell et al. .................... 310/20 |

* cited by examiner

*Primary Examiner*—Burton Mullins
(74) *Attorney, Agent, or Firm*—Jacob Shuster; Howard Kaiser

(57) ABSTRACT

A rotary motor shaft extends through a rheological brake unit through which variable braking resistance to rotation of the motor shaft is applied while it undergoes rotation in response to torque mechanically applied thereto in sequence through a peripheral gear by a selected pair of diagonally aligned electro-magnetically energized push-rod actuators adjustably positioned axially along a varying diameter section of the gear under electrical control for stroke change to yield a variable output torque.

9 Claims, 3 Drawing Sheets

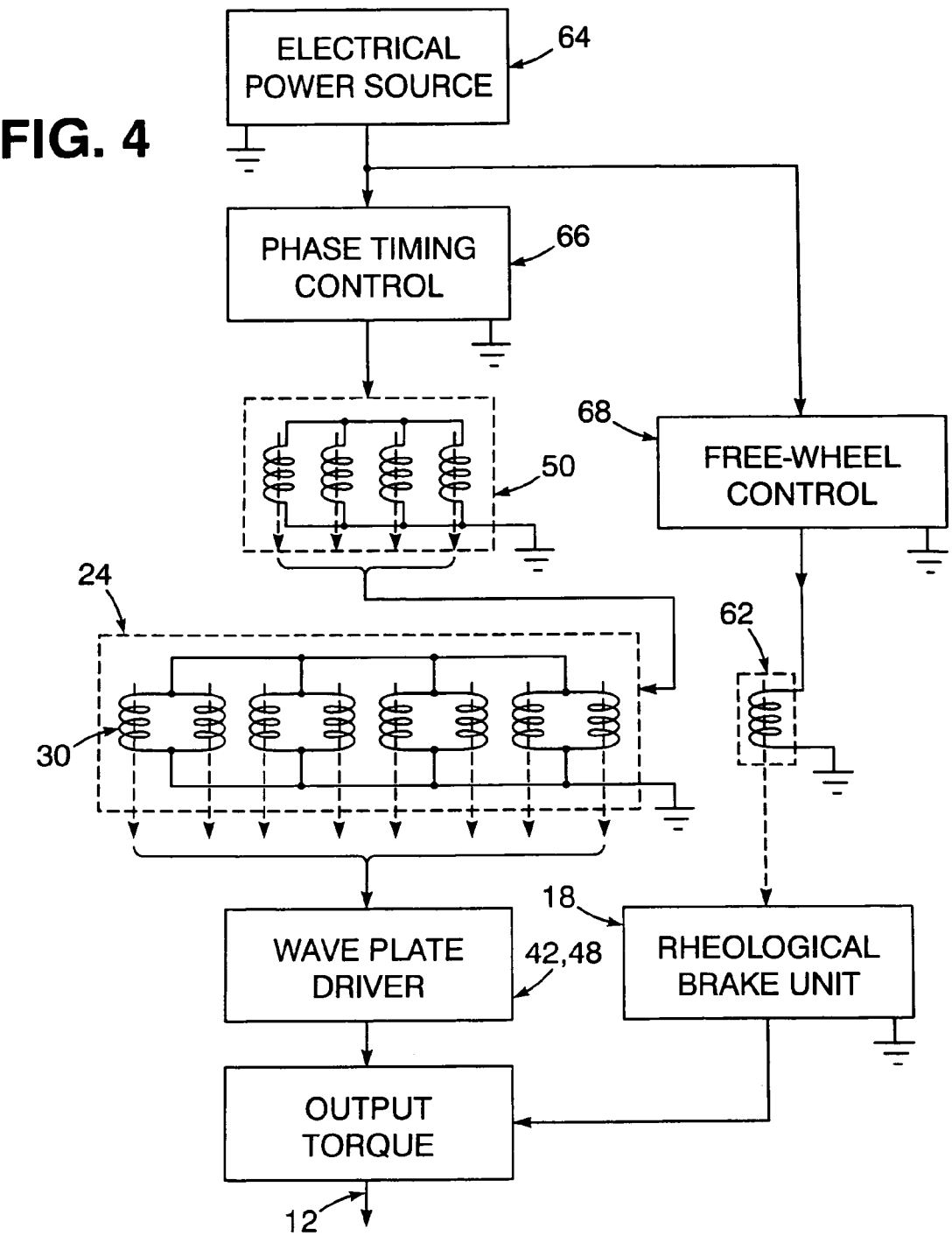

DIRECT DRIVE HYBRID ROTARY MOTOR

CROSS-REFERENCE TO RELATED APPLICATION

This application is a continuation-in-part of U.S. Nonprovisional application Ser. No. 10/807,580, filed Mar. 23, 2004 now abandoned, entitled "Direct Drive Hybrid Rotary Motor." incorporated herein by reference.

STATEMENT OF GOVERNMENT INTEREST

The invention described herein may be manufactured and used by or for the Government of the United States of America for governmental purposes without the payment of any royalties thereon or therefor.

The present invention relates generally to an electro-mechanically controlled, electro-magnetic conversion type of rotary motor.

BACKGROUND OF THE INVENTION

Electromagnetic drive motors with operational phase controls are generally known in the art as disclosed for example in U.S. Pat. No. 5,602,434 to Riedl, involving use of electromagnetic actuator rods engageable with a rotor under phase control to induce rotation thereof.

An important object of the present invention is to provide an electrically powered motor having plural components matched to the output torque load being applied in mechanical impedance manner for enhancing electro-motive energy conversion.

SUMMARY OF THE INVENTION

Pursuant to the present invention, an electric motor has an output shaft connected to a sloped lobe gear having peripheral gear teeth that varies in diameter along an axial end section thereof. Torque is applied to the output shaft by engagement of said variable diameter end section of the gear with push rods projecting from electromagnetic actuators positioned in angular spaced relation to each other about the output shaft on rail supports anchored to a rheological brake unit through which the output shaft extends. Under control applied through magnetic fields to rheological fluid within the brake unit, braking effect is removed from the gear during a free-wheeling operational phase. Electrical energy is also applied to the actuators for mechanically imparting torque to the output shaft through a pair of aligned push-rods engaging the peripheral gear at an axial location along the variable diameter end section selected under stroke control for selectively varied conversion of drive force into the torque applied to the output shaft.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein:

FIG. 4 is an operational diagram of a rotary motor drive system corresponding to that associated with the rotary drive motor illustrated in FIGS. 1, 2 and 3.

DETAILED DESCRIPTION OF THE PREFERRED EMBODIMENT

Figure 1:
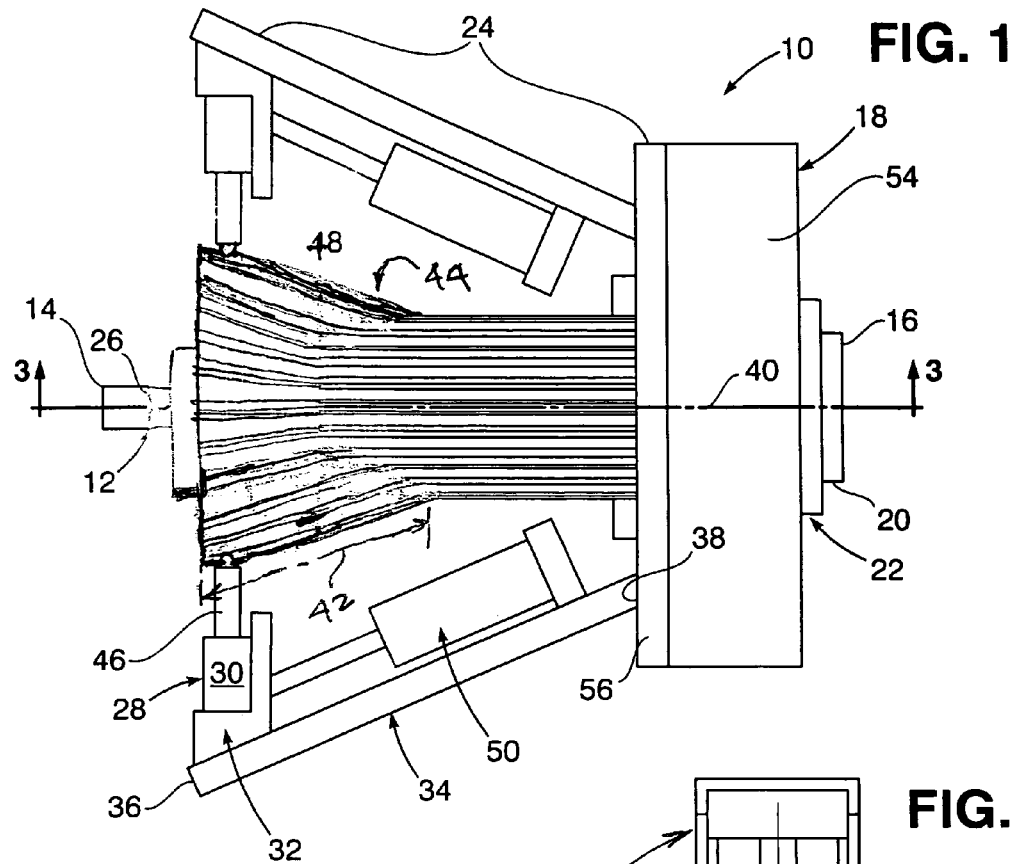
FIG. 1 is a side elevation view of a rotary drive motor constructed in accordance with one embodiment of the present invention.

Referring now to the drawing in detail, FIG. 1 illustrates a rotary drive motor 10 having an axially elongated output rotor shaft 12 with a small diameter end 14 and an opposite larger diameter base end 16. According to the embodiment shown in FIG. 1, a clutch-brake unit 18 is positioned on an end section 20 of the shaft 12 adjacent the base end 16, in abutment with a thrust bearing component 22. A torque drive imparting assembly generally referred to by reference numeral 24 is positioned on the shaft 12 between the unit 18 and a small diameter shaft end section 26 at the axial shaft end 14.

Figure 2:
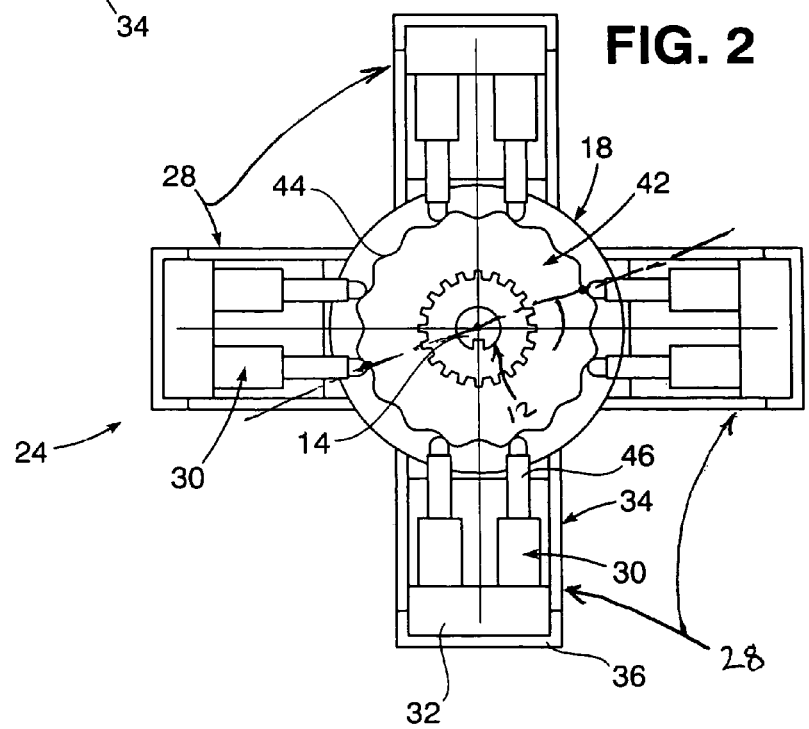
FIG. 2 is a front elevation view of the rotary drive motor illustrated in FIG. 1.

As shown in FIG. 2, the torque drive imparting assembly 24 includes four actuator units 28 positioned in 90° angular relation to each other about the shaft 12. Each of such actuator units 28 includes a pair of cylindrical actuator devices 30 held in close parallel spaced relation to each other within a support 32. Each of the actuator supports 32 as shown in FIGS. 1 and 2 is adjustably positioned within an elongated rail 34 at an outer end 36 opposite an inner end 38 anchored to the unit 18. Each rail 34 accordingly extends in angular relation to the axis 40 of the shaft 12 radially spaced therefrom by an increasing amount from the anchored rail ends 38 to the opposite rail ends 36 at which the actuator devices 30 are adjustably positioned by adjustment devices 50 along an axial end section 42 of a peripheral gear 44 connected to the shaft end section 26. Projecting from each of the cylindrical actuator devices 30 is a driving push rod 46, for engagement with the periphery of the gear 44 along its axial end section 42 so as to impart a continuously varying output torque to the output shaft 12

Figure 3:
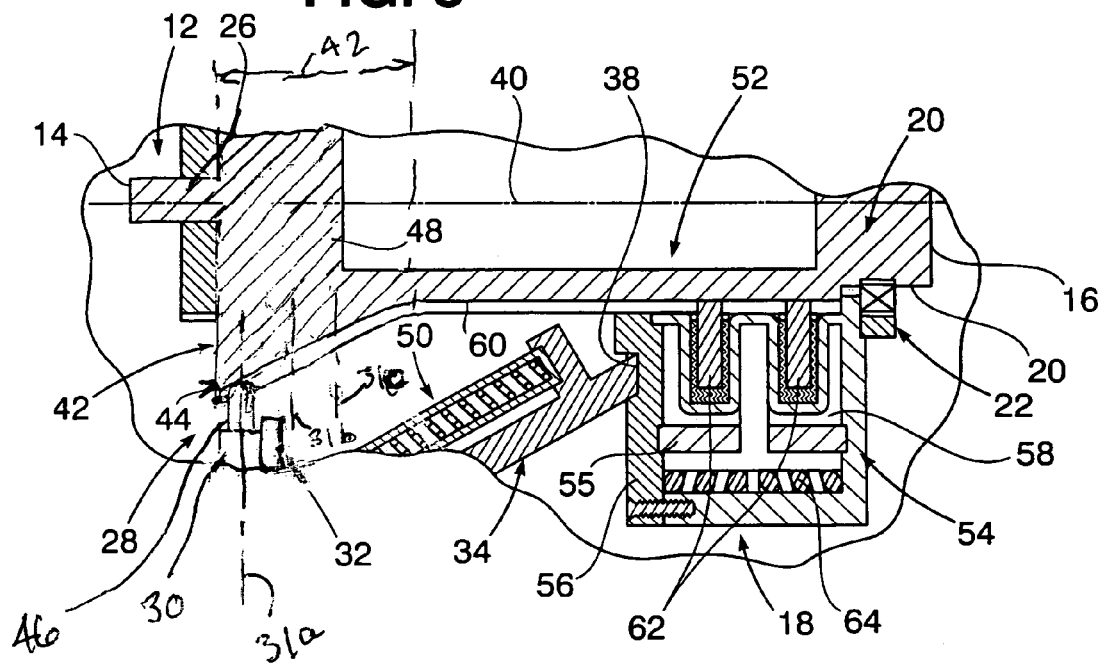
FIG. 3 is a partial side section view taken substantially through a plane indicated by section line 3-3 in FIG. 1.

As shown in FIGS. 1 and 3, the actuator units 28 may be axially displaced on its support 32 from an axial position 31(a) at the end 36 of its rail 34 as designated in FIG. 3 to two other axial positions 31(b) and 31(c) along the axial end section 42 of the gear 44 so as to effect a change in stroke of the drive forces applied to shaft 12 by the actuator driven push rods 46 dependent on the variation in peripheral diameter of the gear 44 along the end section 42. Such repositioning of the actuator units 28 on the rails 34 is effected by the positioning adjustment devices 50 respectively mounted on each of the rails 34 and connected to the actuator unit supports 32.

With continued reference to FIG. 3, the unit 18 is shown positioned on an intermediate larger diameter hollowed section 52 of the shaft 12 extending between the shaft end sections 20 and 26. The unit 18 includes an outer cylindrical housing 54 positioned on the section 52 in abutment with the thrust bearing component 22 at one axial end opposite its other axial housing end plate 56. The ends 38 of the rails 34 are anchored to the housing end plate 56. The housing 54 is fixedly anchored in position on the shaft section 52 for rotational support of the shaft 12 which is rotated relative to the housing 54 about its axis 40. Enclosed within the housing 54 are chambers 58 filled with a magneto-reheological fluid in surrounding relation to the shaft section 52 which is peripherally formed with splines 60 through which a pair discs 62 within the chambers 58 are positioned rotationally fixed to the shaft 12 by the shaft section 52. An electromagnetic coil 64 is also positioned within the housing 54 overlying a pair of permanent magnets 55, to partially or fully negate the braking effect thereby applied to the shaft 12 by the magnetic fields of the magnets 55 for free wheeling purposes. The magnetorheological fluid filing the chamber 58 within such magnetic fields provides variable braking resistance to rotation of the shaft 12 through the discs 62.

As diagrammed in FIG. 4, an electrical power source 64 supplies electrical energy through timing phase control 66 to one pair of the four actuator devices 30 associated with the drive torque imparting assembly 24 from which the generated drive forces are transferred through the gear 44 as torque applied to the output shaft 12. The pair of the actuator devices 30 selected for imparting torque are aligned with each other along a diagonal line 67 as indicated in FIG. 2. The electrical energy from the source 64 is also supplied through control 66 to the positioning devices 50 for adjustable displacement of the drive torque imparting assembly 24 between its positions 31(*a*), 31(*b*) and 31(*c*) for stroke change purposes. Finally, through the free-wheel control 68, electrical energy from the source 64 is applied to coil 62 in the unit 18 during power-off phase of operation with respect to drive of the output shaft 12 by the actuators 30, for free-wheeling purposes.

Obviously, other modifications and variations of the present invention may be possible in light of the foregoing teachings. It is therefore to be understood that within the scope of the appended claims the invention may be practiced otherwise than as specifically described.

What is claimed is:

1. An adjustable torque-imparting motor comprising a gear element, plural push members, and a positioning unit, said gear element having a rotational geometric axis and a conical frustum-shaped, circumferentially undulating outside gear surface, said outside gear surface having a diameter that increases linearly along said axis, each axial location having a corresponding said diameter, said push members being disposed near said outside gear surface for pushing upon said gear element, said push members lying at least substantially in a geometric plane that is perpendicular to said axis at a said axial location, said positioning unit being associated with said push members for moving said push members generally parallel to said outside gear surface and along said axis and for selectively positioning said push members at a said axial location, wherein the torque imparted to an object connected to said gear element is adjustable in accordance with the selected said axial location.

2. The adjustable torque-imparting motor of claim 1, wherein said push members are symmetrically configured with respect to said axis.

3. The adjustable torque-imparting motor of claim 2, wherein at any instant that said push members are pushing, the pushing said push members are two concurrently pushing said push members that are on opposite sides of and diagonally aligned with said axis.

4. The adjustable torque-imparting motor of claim 3, wherein said torque imparted to said object is maintained via sequential said pushing, two concurrently pushing said push members at a time.

5. The adjustable torque-imparting motor of claim 1, wherein said push members include eight said push members symmetrically configured in adjacent pairs that are spaced apart from each other generally at right angles with respect to said axis, a first said adjacent pair being on opposite sides of said axis, a second said adjacent pair being on opposite sides of said axis.

6. The adjustable torque-imparting motor of claim 5, wherein at any instant that said push members are pushing, the pushing said push members include two concurrently pushing said push members that are both in one of the first said adjacent pair and the second said adjacent pair, the two concurrent pushing said push members being in different said adjacent pairs and being diagonally aligned with said axis.

7. The adjustable torque-imparting motor of claim 6, wherein said torque imparted to said object is maintained via sequential said pushing, two concurrently pushing said push members at a time.

8. A motor for imparting torque comprising a gear apparatus and a drive apparatus, said drive apparatus including at least eight push rods, at least four holders, and a positioning device, each said holder being for holding an adjacent pair of said push rods, said positioning device being for positioning said holders, said gear apparatus including a conical frustum component, said conical frustum component being characterized by and rotatable about an axis, said conical frustum component having a periphery characterized by a diameter that varies linearly along said axis, said periphery being circumferentially undulate with respect to said axis, said at least eight push rods being arranged in at least four said adjacent pairs so as to be generally symmetrical with respect to said axis and so as to generally lie in a geometric plane that is perpendicular to said axis, each said push rod being proximate said periphery and approximately radial with respect to said axis, said at least eight push rods being operable in at least four opposite pairs so that one said opposite pair at a time is actuated so as to forcefully engage said periphery, said push rods of each said opposite pair being opposite each other in diagonal alignment with said axis, said positioning device including at least four tracks, each said track being associated with a said holder, each said track being at least substantially parallel to said periphery and at least substantially coplanar with said axis, said positioning device being capable of bi-directionally displacing and selectively positioning said holders so that said push rods are placed for engaging said periphery at a selected said diameter of said periphery, the application of force by said drive apparatus to said conical frustum component, and hence the imparting of torque to a body attached to said gear apparatus, thereby being adjustable in accordance with the selected said diameter.

9. The motor for imparting torque of claim 8, said push rods being operable so that so that said opposite pairs are successively actuated, said push rods thereby acting in a stepwise manner so as to cause said gear apparatus to continually rotate about said axis.

\* \* \* \* \*